United States Patent
Tschäschke et al.

(10) Patent No.: US 6,257,618 B1
(45) Date of Patent: Jul. 10, 2001

(54) COLLISION PROTECTION DEVICE, ESPECIALLY FOR VEHICLE PASSENGERS

(75) Inventors: Ulrich Tschäschke, Ehningen; Stefan Reh, Wörth; Michael Gumprecht, Schellerten, all of (DE)

(73) Assignees: Daimler-Benz Aktiengesellschaft; Petri AG; Phoenix Airbag GmbH & Co. KG, all of (DE)

( * ) Notice: Subject to any disclaimer, the term of this patent is extended or adjusted under 35 U.S.C. 154(b) by 0 days.

(21) Appl. No.: 08/945,927

(22) PCT Filed: Apr. 24, 1996

(86) PCT No.: PCT/DE96/00710

§ 371 Date: Feb. 20, 1998

§ 102(e) Date: Feb. 20, 1998

(87) PCT Pub. No.: WO96/33887

PCT Pub. Date: Oct. 31, 1996

(30) Foreign Application Priority Data

Apr. 28, 1995 (DE) .................................................. 19515232

(51) Int. Cl.$^7$ .................................................. B60R 21/16
(52) U.S. Cl. ...................................... 280/743.2; 280/743.1
(58) Field of Search ............................. 280/743.2, 743.1, 280/728.1

(56) References Cited

U.S. PATENT DOCUMENTS

| | | | | |
|---|---|---|---|---|
| 4,934,734 | * | 6/1990 | Takada | 280/731 |
| 4,966,389 | * | 10/1990 | Takada | 280/743.2 |
| 5,078,423 | * | 1/1992 | Fujita | 280/743.2 |

FOREIGN PATENT DOCUMENTS

| | | | | |
|---|---|---|---|---|
| 1438032 | * | 2/1973 | (GB) | 280/743.2 |
| 2243119 | * | 10/1991 | (GB) | 280/743.2 |
| 6072267 | * | 3/1994 | (JP) | 280/743.2 |

* cited by examiner

Primary Examiner—J. J. Swann
Assistant Examiner—F. Zeender
(74) Attorney, Agent, or Firm—Pendorf & Cutliff

(57) ABSTRACT

The invention relates to a collision protection device, especially for passengers in vehicles and more especially in motor vehicles, consisting of a cushion or a cover plate, an air bag, a securing component, electronic or mechanical devices and a gas generator, in which the air bag consists of a coated or uncoated fabric, a lower section (2) with a gas inlet aperture, which may be fitted with a flame guard, an upper section (1), one or more multi-layer safety stop bands (3), where the ends of the safety stop band(s) is/are secured by sewn seams (4) to the upper section, the lower section, other components or, if there are more than one of them, together, in which the sewn seams are substantially circular or oval within the ends of the safety stop band(s).

18 Claims, 3 Drawing Sheets

COLLISION PROTECTION DEVICE, ESPECIALLY FOR VEHICLE PASSENGERS

BACKGROUND OF THE INVENTION

1. Field of the Invention

The invention concerns a collision protection device for passengers of vehicles, in particular for motor vehicles, consisting of upholstering (padding) or, as the case may be, cover plate, air bag, securing component (for example, mounting sheet metal), electronic or mechanical devices and gas generator; wherein the air bag is comprised of fabric (for example, polyamide fabric) with or without coating comprising a lower section with a gas inlet aperture, which may be fitted or provided with a flame guard, an upper section (passenger impact side) and a safety stop band (catch band, catch strap) or multiple safety stop bands, having one or more layers; wherein the ends of the safety stop band or as the case may be safety stop bands are attached by sewing seams to the upper section, the lower section, other construction components, or—in the case of multiple safety stop bands—to each other.

2. Description of the Related Art

Air bags for the air bag system in motor vehicles according to the state of the art are comprised of at least one safety stop band, which influences both the unfolding process as well also as the shape of the air bag in the fully inflated condition in-so-far that the protective function of the surface facing the vehicle passengers to be protected is thereby improved. Known embodiments of such air bags have multiple safety stop bands (E-A-44 12 829, U.S. Pat. No. 5,205,584) of which the ends are integrated or connected with other construction components (for example, flame protector) (U.S. Pat. No. 5,033,771, U.S. Pat. No. 5,078,423).

It is also known that the respective ends of the safety stop band or, as the case may be, safety stop bands are connected via sewn seams (E-A-4301711) with the upper section, the lower section, other construction elements or—in the case of multiple safety stop bands (E-A4 42 592)—with one another.

A further collision protection device is known from DE-A-40 33 835. Herein the safety stop bands are comprised of two connection arms provided at right-angles to each other, which are connected to each other via a circular stitched part. This part is secured at the upper part via sewn seams. The connecting arms must be folded down about 90°, wherein their ends are sewn with connection pieces, which are secured to the lower part. The assembly of this collision protection device is expensive. Besides this, there exists the danger, that upon application of high loads in the area of the connection pieces the connection becomes disrupted, which reduces or compromises the function of the concerned safety stop band.

SUMMARY OF THE INVENTION

The objective of the invention is comprised therein, of providing a high load bearing or highly secure safety stop band construction in collision protection devices of the above described type by means of appropriately designed or constructed connections, in particular at the upper and lower sections.

The sewn seams therein either describe closed curves or are open on the side away from the force.

The sewn seams can be single seams or multiple seams (in particular double seams), wherein the separation between the multiple seams with respect to each other determine the load bearing capacity at the connection point.

It is further advantageous, when the load characteristic of the connection point is determined by the stitching length in the sewn seams.

Further, it is useful, when the seam shape is so selected, that upon application of force in the longitudinal direction the safety stop band is first stressed in the middle area of it's cross-section. Further, the seam design should create an impact dissipating effect in the shape of the safety stop band.

BRIEF DESCRIPTION OF THE DRAWINGS

The invention will now be described on the basis of illustrative embodiments with reference to the schematic drawings. There are shown.

DETAILED DESCRIPTION OF THE INVENTION

Figure 1:
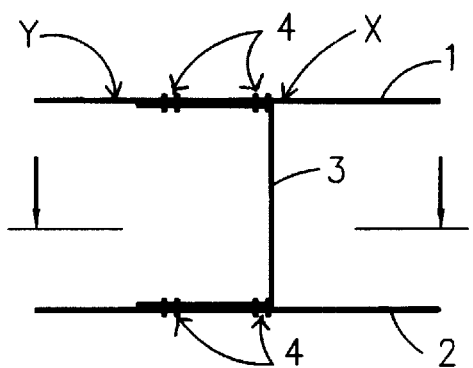
FIG. 1 a sectional representation of the safety stop band in a collision protection device, and this in association with FIGS. 2a and 3.

The following reference number list is applicable with respect to the figures:

1, 1"" Upper section
2, 2', 2", 2'", 2"" Lower section
3, 3', 3", 3'", 3"" Safety stop band
4, 4', 4", 4'", 4"" Sewn seams
5 flame guard According to FIG. 1, the air bag consists of an upper section 1, a lower section 2, and a safety stop band 3 incorporated therebetween, which includes the appropriate fabric sections which form the two ends of the safety stop band, wherein the ends are connected with the upper section or as the case may be the lower section with sewn seams 4. In the case of loading the resulting forces must be transmitted with sufficient security over the shape of the safety stop band and over the connection points to the therewith connected construction elements (here the upper—and lower sections). As is well known, in the case of too abrupt a force transmission, there arises a danger of damage of the construction elements as well as the connection points. Upon force loading of the safety stop bands, particularly high forces occur in the direction X (side facing the force), while in a direction Y (side facing away from force) the forces at play are the smallest.

Figure 2A:
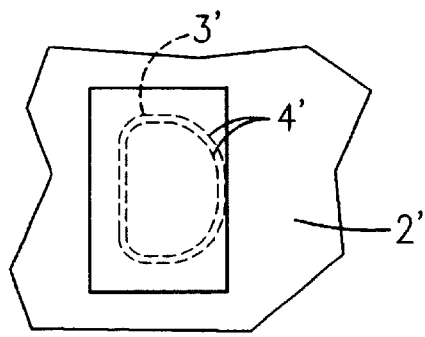
FIG. 2a an essentially oval running sewn seam, as a closed double stitched embodiment.

FIG. 2a shows a closed double stitching 4', which runs essentially in an oval shape, of which the side facing the force is however more rounded in shape than the side away from the force. The seam shape is so designed that the safety stop band 3' upon application of force in the longitudinal direction first is stressed in the central area of the cross-section. Besides this, the sewing shape exercises a force dissipating advantageous shape with respect to the safety stop band under stress.

Figure 2B:
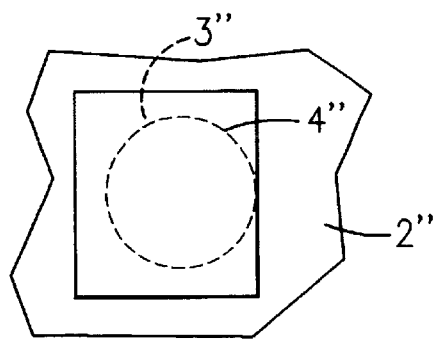
FIG. 2b a closed circular sewn seam, namely as formed by a single stitching.

FIG. 2b shows a closed circular single stitching 4", wherein the entirety of the seam system is mounted or provided towards the side facing the impact. With respect to the reason for this sewing shape for safety stop band 3" reference is made to the description associated with FIG. 2a.

Figure 3:
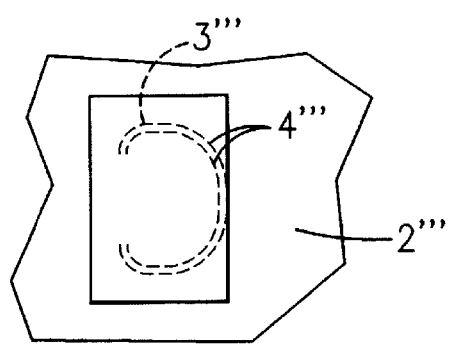
FIG. 3 an essentially oval running sewn seam, which is open in the side away from the force or impact, and namely constructed by a double stitching.

According to FIG. 3, the double seam 4''' is open on the side away from the force, wherein with respect to the shape of the sewing and the reason for the safety stop band 3''' likewise reference is made to the description associated with FIG. 2a.

Figure 4:
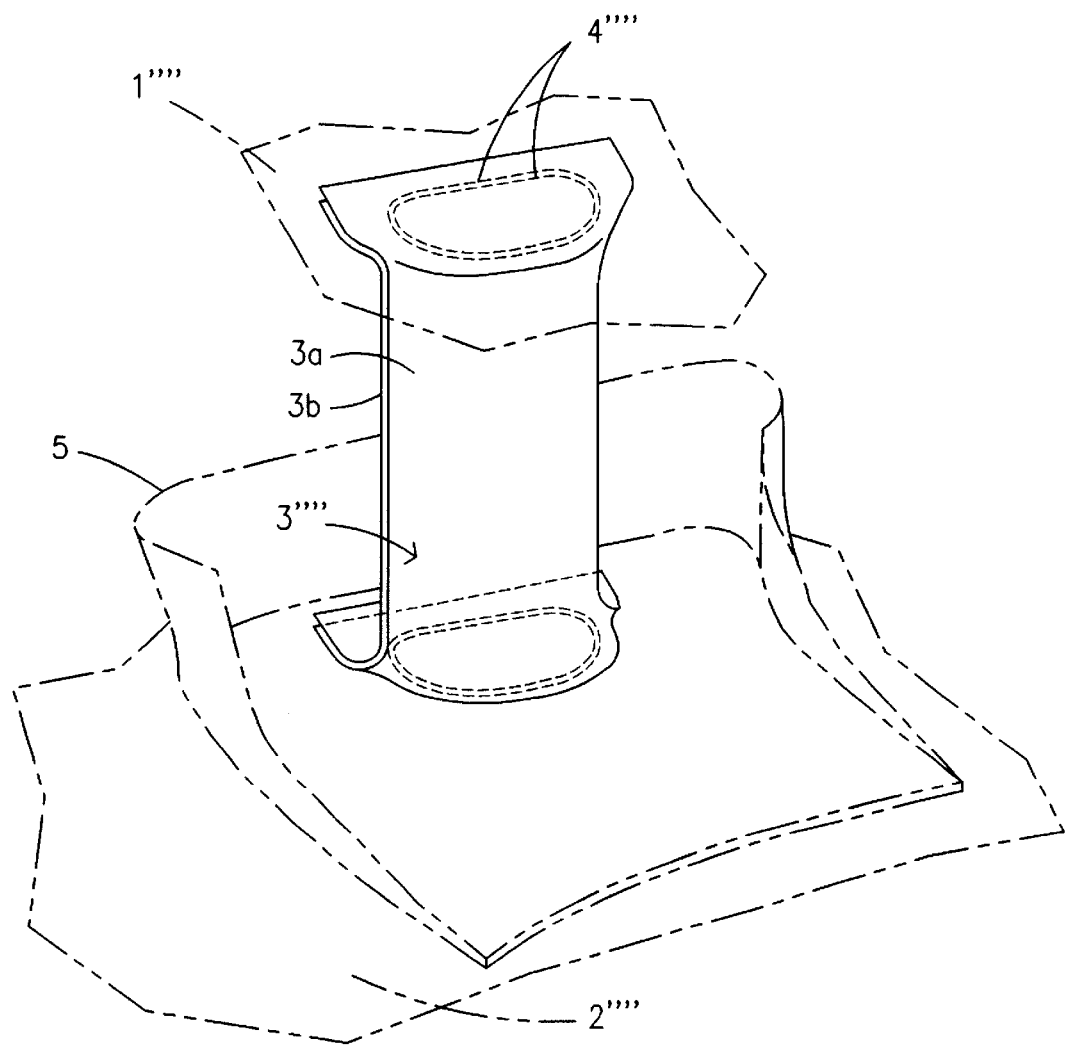
FIG. 4 a spatial representation of a stressed or loaded safety stop band.
Figure 5:
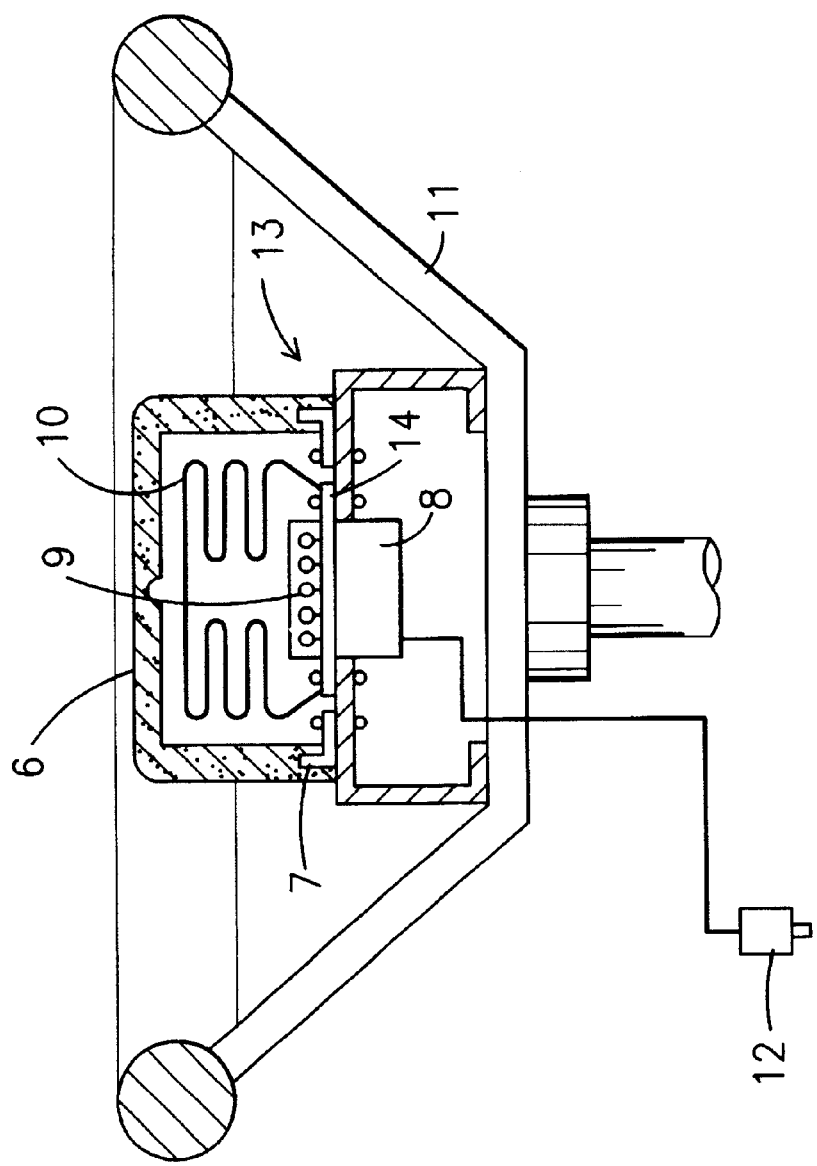
FIG. 5 shows an overview of a prior art air bag of the type improved by the present invention.

FIG. 4 shows a spatial representation of the stressed safety stop band 3'''' including first and second layers (3a, 3b) with closed double seam 4'''' in the area of the connection to upper section 1'''' and lower section 2'''' and flame shield 5. For a more complete understanding, FIG. 5 provides an overview of a prior art air bag system of the type improved by the present invention. Steering wheel 11 includes a hub 13 with a central upholstered covering 6 which covers over air bag 10. Upon detection of a crash by detector or trigger 12, a signal is transmitted to gas generator 8 which rapidly expels gas into the air bag 10 through gas inlet openings 9. As the airbag inflates, it breaks through cover 6 and inflates to form a cushion. Cover 6 is secured by securing component 7 and air bag 10 is secured by securing component 14.

What is claimed is:

1. Collision protection device for passengers of vehicles consisting of:
   a fabric air bag,
   a cover covering at least one side of said air bag,
   a securing component securing said air bag to said vehicle,
   electronic or mechanical devices for triggering deployment of said air bag, and
   a gas generator for inflating said air bag, wherein:
      said fabric air bag consists of a lower section (2, 2', 2", 2''', 2'''') including a gas inlet opening, an upper section (1, 1'''') defining a passenger impact side, and at least one safety stop band (3, 3', 3''', 3'''') having first and second ends, wherein
      the ends of the at least one safety stop band (3, 3', 3''', 3'''') are connected with the upper section (1, 1'''') and the lower section (2, 2', 2", 2''', 2''''), via sewn seams (4, 4', 4", 4''''), wherein the sewn seams respectively describe a closed essentially circular or oval pattern within the ends of the at least one safety stop band (3, 3', 3''', 3''''),
      wherein said at least one safety stop band is a multi-layered safety stop band.

2. Collision protection device as in claim 1, wherein said vehicle is a motor vehicle.

3. Collision protection device as in claim 1, further including a flame guard at said gas inlet opening.

4. Collision protection device as in claim 1 wherein said sewn seams (4") are single seams.

5. Collision protective device as in claim 1, wherein said sewn seams (4, 4', 4", 4'''') are multiple seams.

6. Collision protection device as in claim 5, wherein the spacing between the multiple seams (4, 4', 4''', 4'''') determines the support capacity at the connection point.

7. Collision protection device as in claim 1, wherein the stitching length in the sewn seams (4, 4', 4", 4'''') determines a carrying capacity at the connection point.

8. Collision protection device according to claim 1, wherein the circular or oval sewn pattern is so selected, that upon application of force in the longitudinal direction the at least one safety stop band is first stressed in the central area of its cross-section.

9. Collision protection device according to claim 1, wherein the essentially circular or oval seam pattern causes the at least one safety stop band to assume a beneficial impact dissipating shape when under pressure.

10. Collision protection device for passengers of vehicles consisting of:
    a fabric air bag,
    a cover covering at least one side of said air bag,
    a securing component securing said air bag to said vehicle,
    electronic or mechanical devices for triggering deployment of said air bag, and
    a gas generator for inflating said air bag, wherein:
       said fabric air bag consists of a lower section (2, 2', 2", 2''', 2'''') including a gas inlet opening, an upper section (1, 1'''') defining a passenger impact side, and at least one safety stop band (3, 3', 3''', 3'''') having first and second ends,
       wherein the ends of the safety stop band (3, 3', 3''', 3'''') are connected with the upper section (1, 1'''') and the lower section (2, 2', 2", 2''', 2''''), via sewn seams (4, 4', 4", 4''''),
       wherein the sewn seams respectively describe an essentially C-shaped pattern with an open segment in the part of the sewn pattern closest to the band end, said pattern positioned within the ends of the safety stop band (3, 3', 3''', 3''''), and
       wherein said at least one safety stop band is a multi-layered safety stop band.

11. Collision protection device as in claim 10, wherein said sewn seams (4") are single seams.

12. Collision protective device as in claim 10, wherein said sewn seams (4, 4', 4", 4'''') are multiple seams.

13. Collision protection device as in claim 12, wherein the spacing between the multiple seams (4, 4', 4''', 4'''') determines the support capacity at the connection point.

14. Collision protection device as in claim 10, wherein the stitching length in the sewn seams (4, 4', 4''', 4'''') determines the carrying capacity at the connection point.

15. Collision protection device according to claim 10, wherein the essentially C-shaped sewn pattern is so selected, that upon application of force in the longitudinal direction the at least one safety stop band is first stressed in the central area of its cross-section.

16. Collision protection device according to claim 10, wherein the essentially C-shaped sewn pattern causes the at least one safety stop band to assume a beneficial impact dissipating shape when under pressure.

17. Collision protection device for passengers of vehicles consisting of:
    a fabric air bag,
    a cover covering at least one side of said air bag,
    a securing component securing said air bag to said vehicle,
    electronic or mechanical devices for triggering deployment of said air bag, and
    a gas generator for inflating said air bag, wherein:
       said fabric air bag consists of a lower section (2, 2', 2", 2''', 2'''') including a gas inlet opening, an upper section (1, 1'''') defining a passenger impact side, and at least one safety stop band (3, 3', 3''', 3'''') having first and second ends,
       wherein the ends of the safety stop band (3, 3', 3''', 3'''') are connected with the upper section (1, 1'''') and the lower section (2, 2', 2", 2''', 2''''), via sewn seams (4, 4', 4", 4''''), wherein the sewn seams respectively describe an essentially C-shaped pattern with an open segment in the part of the sewn pattern closest to the band end, said pattern positioned within the ends of the safety stop band (3, 3', 3''', 3''''), and wherein said collision protection device includes multiple overlapping, reinforcing safety stop bands (3, 3', 3''', 3'''') connected to the same area of the upper section and the lower section via the same sewn structure.

18. Collision protection device for passengers of vehicles consisting of:

a fabric air bag, a cover covering at least one side of said air bag, a securing component securing said air bag to said vehicle, electronic or mechanical devices for triggering deployment of said air bag, and a gas generator for inflating said air bag, wherein:

said fabric air bag consists of a lower section (2, 2', 2'', 2''', 2'''') including a gas inlet opening, an upper section (1, 1'''') defining a passenger impact side, and at least one safety stop band (3, 3', 3''', 3'''') having first and second ends, wherein the ends of the at least one safety stop band (3, 3', 3''', 3'''') are connected with the upper section (1, 1'''') and the lower section (2, 2', 2'', 2''', 2''''), via sewn seams (4, 4', 4'', 4''''), wherein the sewn seams respectively describe a closed essentially circular or oval pattern within the ends of the at least one safety stop band (3, 3', 3''', 3''''), wherein said collision protection device includes multiple overlapping safety stop bands (3, 3', 3''', 3'''') connected to the same area of the upper section and the lower section via the same sewn structure.

* * * * *